United States Patent
Engstrom

(10) Patent No.: US 7,249,024 B2
(45) Date of Patent: *Jul. 24, 2007

(54) RESOURCE SAVING PREEMPTION

(75) Inventor: G. Eric Engstrom, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/202,877

(22) Filed: Aug. 12, 2005

(65) Prior Publication Data

US 2006/0009981 A1 Jan. 12, 2006

Related U.S. Application Data

(63) Continuation of application No. 09/872,144, filed on May 31, 2001, now Pat. No. 6,947,894.

(51) Int. Cl.
*G10L 21/00* (2006.01)

(52) U.S. Cl. ..................................... 704/270
(58) Field of Classification Search ................ 704/270
See application file for complete search history.

(56) References Cited

U.S. PATENT DOCUMENTS

| | | | |
|---|---|---|---|
| 5,241,649 A | 8/1993 | Niyada | |
| 5,963,908 A | 10/1999 | Chadha | |
| 6,002,427 A | 12/1999 | Kipust | |
| 6,374,145 B1 | 4/2002 | Lignoul | |
| 6,560,711 B1 | 5/2003 | Given et al. | |
| 6,947,894 B1 * | 9/2005 | Engstrom | .................. 704/270 |

* cited by examiner

*Primary Examiner*—Susan McFadden
(74) *Attorney, Agent, or Firm*—Schwabe, Williamson & Wyatt, P.C.

(57) ABSTRACT

A method and apparatus for allowing a user device to avoid undesired state transitions when the user is present but not performing activities is provided. The method provides for detection of activity in the proximity of the user device by monitoring for sounds via an audio input device connected to the user device. The method further provides for analysis of the detected audio signals on the audio input to determine if the sound detected matches a voice reference sample of the user of the user device. If the detected sound matches the existing voice reference sample of the user, the method provides for simulation of activities on the user device, thereby preventing the user device from performing an undesired state transition, and in turn pre-empting resource saving operations.

34 Claims, 5 Drawing Sheets

RESOURCE SAVING PREEMPTION

CROSS REFERENCE TO RELATED APPLICATIONS

This application is a continuation application of, and claims priority to, U.S. patent application Ser. No. 09/872,144, filed on May 31, 2001, now U.S. Pat. No. 6,947,894 entitled "USER VOICE BASED RESOURCE SAVING PREEMPTION". Application Ser. No. 09/872,144 is hereby incorporated by reference in its entirety.

TECHNICAL FIELD

Embodiments of the present invention relate to the field of data processing, and more specifically, to inactivity based management of a user device.

BACKGROUND

A user device that is to be utilized by a user will typically have varying degrees of usage at different times. There are times when the user device is heavily utilized, and other times when the user device is lightly utilized. The light utilization times can result in periods where the user device operates for an extended length of time without activity. During these inactive periods, it is desirable to curtail unproductive consumption of resources. It is further desirable that the savings of resources be automatically achieved.

A typical saving achieved during periods of non-utilization by a user is related to the curtailing of power usage. The power saving is especially desirable when the device is operating from a battery. For example, when using a laptop computer that is running in a battery mode, it is typical to detect whether there is any activity on the input devices connected to the laptop computer. If there is no activity on the input devices for a certain period, then the laptop computer will automatically save appropriate recovery information to a fixed disk and enter a sleep mode. Similarly, on another type of user device, after a certain period of inactivity on the input devices, the user device will switch off the user device's display to conserve power.

Another type of conservation occurs when a user is connected to a server via a limited resource network access, and there is a period of inactivity on the connection. For example, a handheld user device may be connected to a network though a dial-up connection via a wireless modem. If the handheld user device is not utilized, while the connection remains in place, the wireless channel used for the connection to the network is tied up and unavailable for other usage. In such a case, the handheld user device will detect when the handheld user device is inactive and, at some time (most likely pre-determined by the user in advance), will automatically disconnect the handheld device from the network, thus freeing the wireless channel.

These are but two examples of the types of resource savings that can occur when a user leaves a user device without user input activity. There are however, times when a user device is not experiencing user input activity but, nonetheless, the user does not wish for the user device to engage in the state transition that will bring about the resource saving operations. For example, a user may stop utilization of a user device to receive a phone call. Upon completion of the call, the user may wish to return to the use of the user device. If the call lasted for a period only slightly longer than a timeout associated with initiation of a state change in the user device, it may well be that the state transition is not desired. Thus, a method for more intelligently determining when to engage in these resource saving operations is desired.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Figure 1:
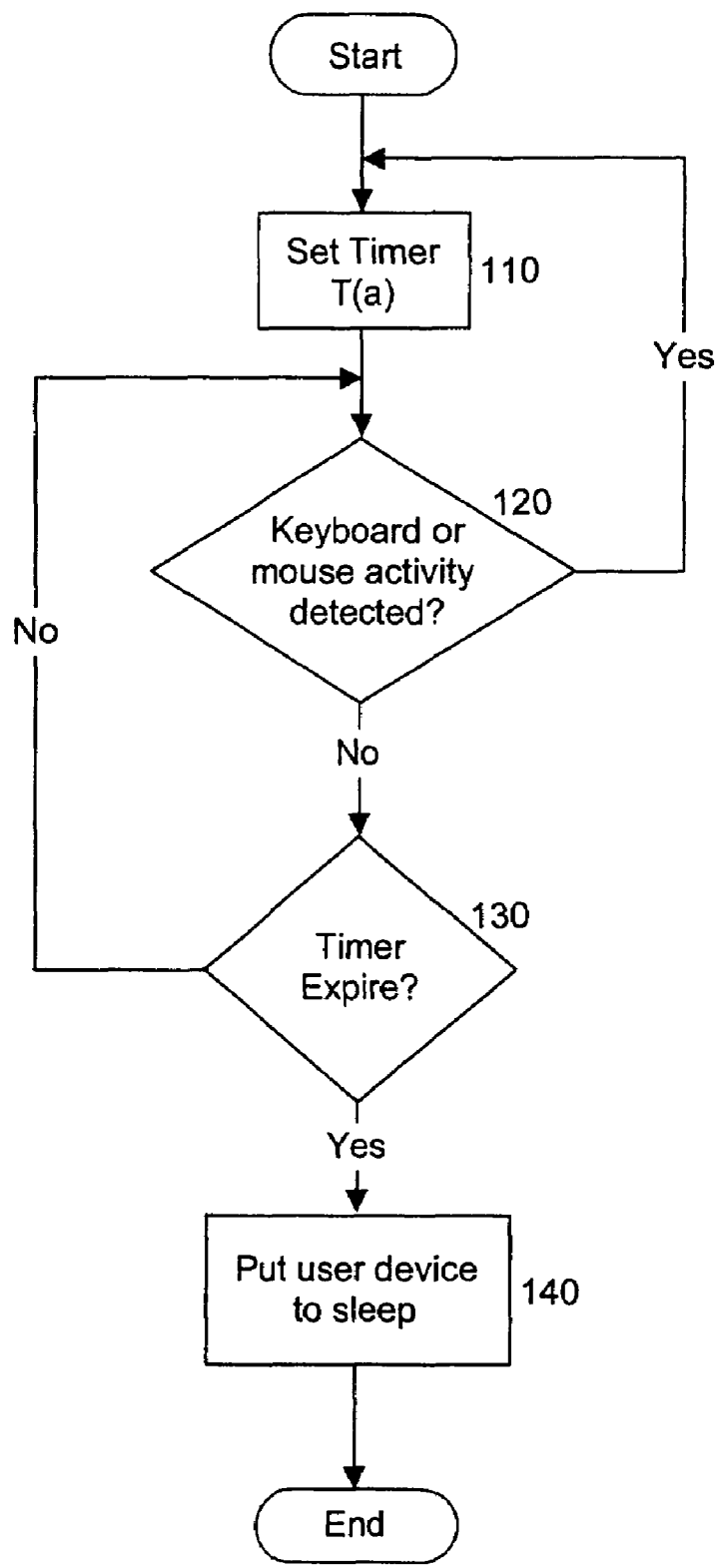
FIG. 1—Prior art method for shutting down unused user devices.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as threads, resources, sleep, disconnecting, timeouts, API, initialization, simulated and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Embodiments of the present invention provide a method and apparatus for allowing a user device to avoid undesired state transitions when the user is present but not performing activities is provided. The method provides for detection of activity in the proximity of the user device by monitoring for sounds via an audio input device connected to the user device. The method further provides for analysis of the detected audio signals on the audio input to determine if the sound detected matches a voice reference sample of the user of the user device. If the detected sound matches the existing voice reference sample of the user, the method provides for simulation of activities on the user device, thereby preventing the user device from performing an undesired state transition, and in turn pre-empting resource saving operations.

In one embodiment of the present invention, if the voice of a user is detected, and the timer associated with the initiation of a resource saving operation is about to expire, an input keystroke or cursor movement will be simulated for the user device. The simulated keystroke/cursor movement prevents the timer from expiring, thereby preempting the user device from entering a sleep mode at a pre-specified time due to user inactivity.

In another embodiment of the present invention, if the voice of the user is detected, and the timer associated with the initiation of a resource saving operation is about to expire, a simulated network packet will be sent to a network connection handler. The simulated network packet prevents the timer from expiring, thereby preempting the network connection handler from removing the connection to a network in a dial-up network configuration.

Users can configure a user device to automatically institute state transitions designed to save resources. It is desirable to configure user devices to do so, because users often leave their devices powered on, connected to or consuming resources, and not performing productive works. Without these automatic state transitions, substantial amount of resources may be wasted.

However, in the case where a user device is configured to automatically institute actions to save resources, these automatic resource saving actions are typically executed regardless of whether the user is about to resume usage of the device or not. It may be the case that the user is still proximately located next to the user device, but merely suspended usage of the device for a short period (for whatever reasons). However, the user may resume usage of the device at any moment. In such a case, it is frustrating to the user, and hence undesirable, to have the automatic state change to save resources occur. The unwanted state change is undesirable because, typically, to get out of the resource saving state, the user is required to perform one or more actions. The completion of these required actions is often time consuming.

For example, a user may need to reestablish a network connection in a telnet session after the user device has terminated a connection to a server due to inactivity on the user device. In such a case, the user will need to re-dial and re-logon to the server again. It is further possible that, when the session was terminated, undesirable process termination also occurred, resulting in hours of lost work and/or processing time. Another example is when a user must bring a user device back to a normal operation mode from a sleep mode. The device has previously gone into the sleep mode when there was no pointer device or keyboard input to the user device. In this case, the user device may need to restore the device state from a mass storage device. This process can be relatively time consuming. Thus, in cases where the user is nearby but merely temporarily working on another project not utilizing the user device, it is desirable to automatically ascertain the user's presence, and use the discerned presence as an indicator to prevent initiation of resource saving operations.

Frequently users will have, attached to the user devices, audio input devices, such as microphones. These audio input devices provide for the ability to perform such tasks as recording voice messages for things like electronic mail attachments, performing dictation to a software package that will convert voice to text and voice over Internet Protocol (IP) applications. If a device is available to record a user's voice, the device can also be used to monitor the presence of the user in the proximity of the user device. By monitoring for activities on the audio input device, and comparing the audio input signals, to a pre-stored sample of a user's voice, the user device can determine whether the user is still proximately located next to the user device. If the user is in proximately located next to the user device, the user device may decide to forego certain resource saving operations that might otherwise take place.

Resource Saving Functions

FIG. 1 shows a typical flowchart of a control process in the prior art for a user device that monitors the activity of a user for determination of periods of inactivity, and initiates resource saving operations in response to the detection of inactivity. At 110, the control process sets a timer for a period of time [T(a)]. This period of time represents a period, during which, if there is no keyboard activity or mouse activity, the user device will put itself into a sleep mode. If there is activity during this time, then the control process resets the timer 120. If not, the control process checks to see if the timer has expired 130. If so, the control process puts the user device into the sleep mode 140. Typically, a user device shuts down most, if not all of its non-essential components, when entering the sleep mode.

Figure 2:
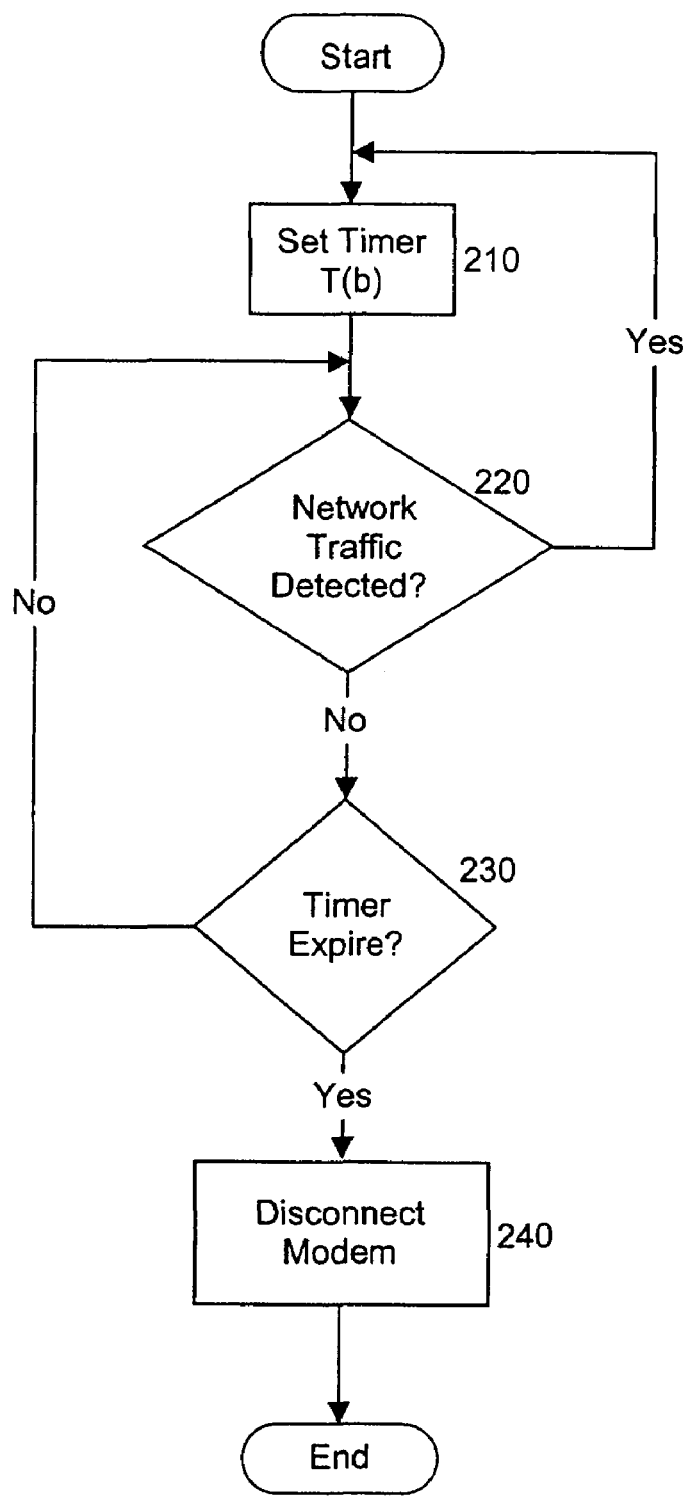
FIG. 2—Prior art method for disconnecting a user device from an unused network connection.

FIG. 2 shows a similar control process of the prior art that performs a slightly different resource saving function. Here the control process is designed to release unused resources associated with a modem connection to a network. At 210, the control process sets a timer. Next, the control process checks to see if there has been network traffic received via the modem 220. If so, the control process resets the timer. If there has been no network traffic, the control process checks for the expiration of the timer 230. If the timer has expired without detection of network traffic, the control process tears down the modem connection 240.

There are other prior art control processes for controlling resources during periods of inactivity; powering down of unused disk drives, disconnecting other non-modem network connections, halting transmissions via wireless ports and so forth. The two earlier described control processes are meant to be exemplary, and therefore not a complete list, of the kinds of control processes with which the present invention will work.

Operation of the Present Invention

Figure 3:
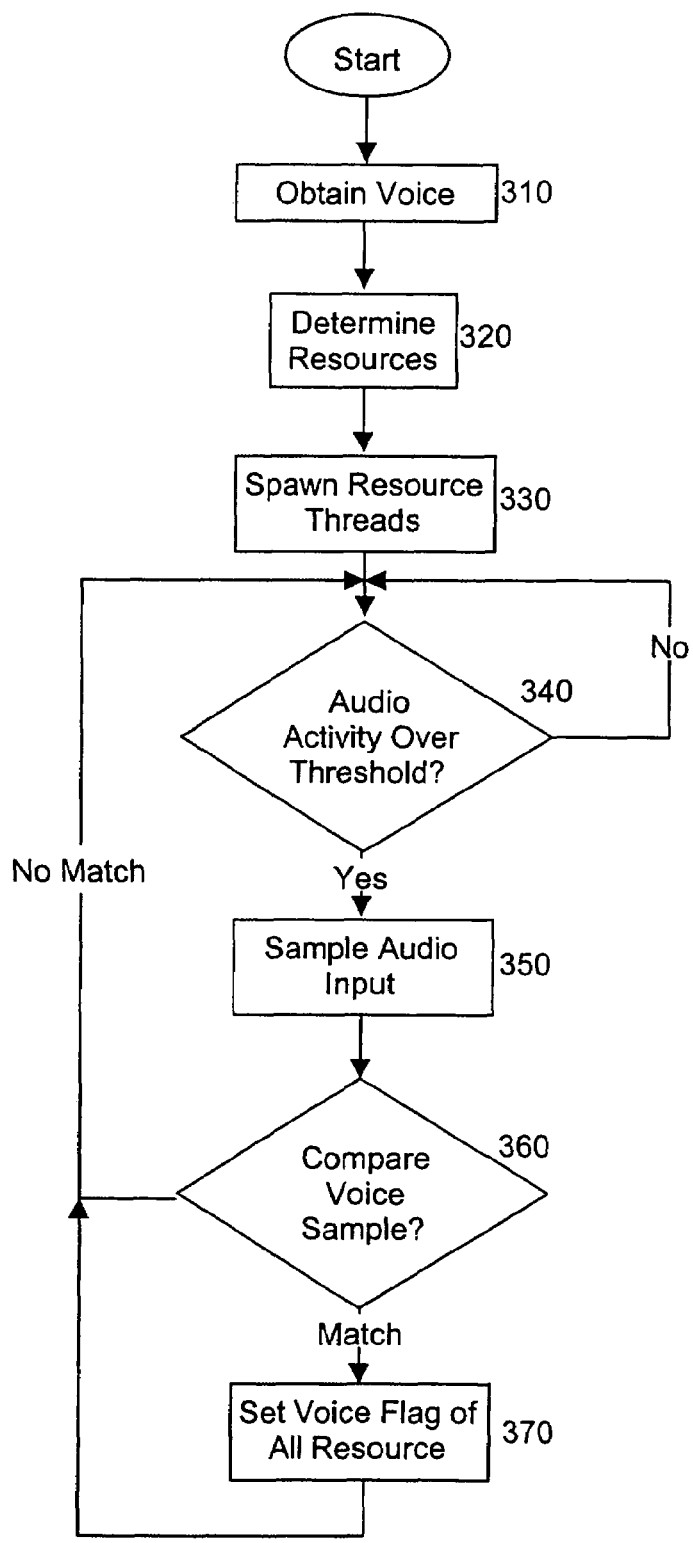
FIG. 3—Main thread for one embodiment of the present invention.
Figure 4:
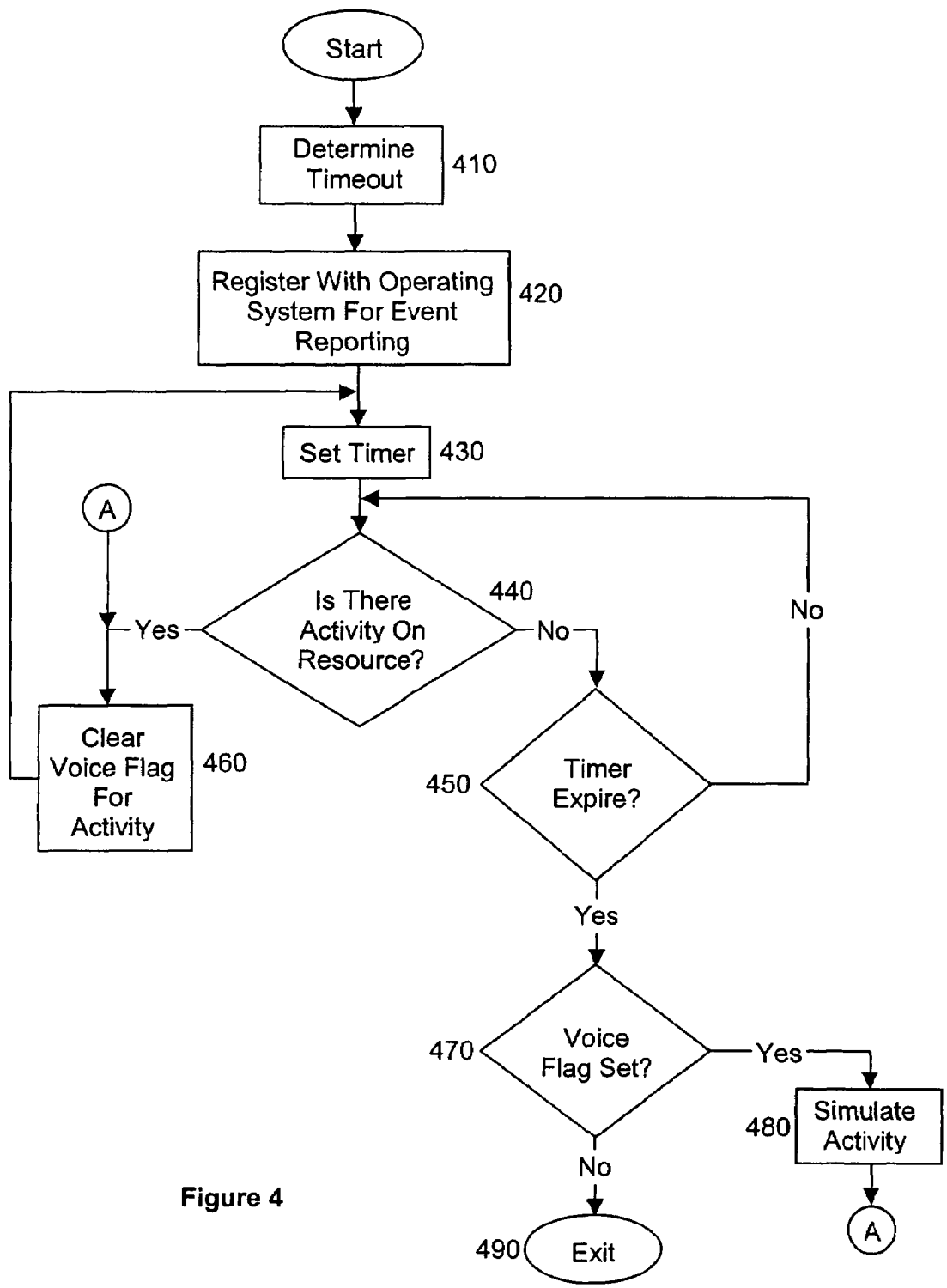
FIG. 4—Resource specific child thread for an embodiment of the present invention.

As mentioned, the present invention will allow a user device to keep from undergoing a resource saving state transition when a user is detected to be in the proximity of a user device. The desired prevention will be done by monitoring a user audio input device and determining whether a user's voice is present in the audio signals sourced from the audio input device. If so, the resource saving state transition will be preempted. One embodiment of the present invention will have the functions of the present invention divided into several tasks, with the tasks correspondingly implemented via different threads (to be referred to as primary and child threads). FIG. 3 shows a primary thread for an embodiment of the present invention that contains startup and voice control functions. FIG. 4 shows an exemplary child thread for controlling a resource to be affected by the present invention. For this embodiment, one child thread is used for each resource, where user voice based preemption of resource saving operations is desired.

Refer now to the embodiment shown in FIG. 3. For this embodiment, the present invention assumes a reference sample of the user's voice is pre-provided. On initialization, the primary thread obtains the reference sample from a pre-determined location 310. One method for obtaining this voice reference sample will be addressed below in the section "Initial Voice Pattern Determination".

As noted in the previous section, there are various types of resource saving operations that can occur as part of an automated control process. In the embodiment shown in FIG. 3, the next step is the determination of the types of resource saving operations to be affected 320. In this embodiment of the present invention, the resource saving operations to be preempted (if the user is proximately located) can be determined, as a user function, by having the user select from a preexisting list of resource saving operations. This list may be a generic list supported without taking into account any of the specific hardware devices present on the user device under the operation of the present invention. Any resource saving operation chosen but not supported in the user device may simply be ignored.

In another embodiment of the present invention, the primary thread may construct a list of preempt-able resource saving operations based on devices present on the user's device. The devices present on the user's device may be discerned from a master list of known resource saving operations supported by the user devices. The master list may e.g. be maintained by the operating system of the user device. For example, the primary thread may learn from the operating system that the user device supports anti-hard disk power down support, anti-monitor power down support, anti-modem disconnect support, and so forth. However, a query of the operating system's configuration database may determine that there is no modem installed on this user device. The resultant list of resource saving operations preempt-able by the present invention, to be displayed to the user for the user's selection, would accordingly include only the anti-hard disk power down support and the anti-monitor power down support.

Returning now to the embodiment shown in FIG. 3, once the resource saving operations, against which the present invention may preempt, have been determined, the primary thread spawns separate child threads for each object resource of the selected resource saving operations 330. One of such child threads, in accordance with one embodiment, will be discussed below with respect to FIG. 4. Next, the primary thread checks for activity on the audio input device 340. When activity over a certain threshold input (volume) level is detected, the primary thread begins collection of one or more audio samples from the audio input device 350. The threshold level can be determined by user selection or set at a fixed level. After obtaining the audio samples, the primary thread determines whether the collected audio samples substantially match the user's voice reference sample pre-acquired 360. The process of recognizing voice information is known in the art and will not be described here. References to such techniques include "U.S. Pat. No. 6,128,594—Process of voice recognition in a harsh environment, and device for implementation" and "5313555—Lombard voice recognition method and apparatus for recognizing voices in noisy circumstance". If the primary thread detects that there is a voice match, the primary thread sets one or more "detection" flags 370 indicating "positive" voice activity. These flags will be utilized by the child threads to preempt the corresponding resource saving operations, discussed in further detail below. Thread synchronization of the shared flags is known in the art and will not be further discussed here. The primary thread then loops back and continues the task of monitoring for additional voice activities.

FIG. 4 shows an exemplary child thread spawned from the primary thread 330 shown in FIG. 3. This example shows how the keyboard and mouse resources are monitored and simulated when there is appropriate user voice activity detected. Upon transfer of execution control, a child thread first performs several initialization tasks. The first initialization task is to determine what the appropriate timeout period is for the given resource the child thread is responsible for 410. As discussed above in the section "Resource Saving Functions", each of the resource saving operations that the user device engages in will be a result of a period of inactivity (e.g. T(a), T(b)). Each of these periods of inactivity is a timeout period. See the section below entitled "Determining Timeout Periods" for details on how the length of these timeout periods may be determined.

As the second and final setup steps, for this embodiment of the present invention, after determining the timeout period for the resource to be monitored, the child thread begins the configuration of notification by the operating system of the appropriate resource activity. More specifically, the child thread registers itself with the operating system, such that any activity on the keyboard or with the mouse will be reported to the child thread 420. Once these two setup steps have taken place, the child thread is ready to begin its functional mode.

At the start of the main function of a child thread, a timer is set based on the timeout period for the resource being monitored 430. The timer is set to an expiration time that is slightly less than the timeout period for the resource as determined above. The reason for the setting the timer to an expiration time slightly less than the determined timeout period is to allow time for the checking of the presence of the user's voice prior to the timeout, which will cause the invocation of the resource saving operations. After setting the timer, the child thread goes into a waiting mode to wait for either (a) activity to occur on the user device 440 or (b) expiration of the aforementioned timer 450.

If there is activity (e.g. keyboard or mouse activities), the child thread clears the voice flag that may have been set by the primary thread 460. The primary thread was discussed above with respect to FIG. 3. By clearing the voice flag, the thread makes sure that only voice activity that occurs after the last activity will be considered in determining whether to simulate user activity (to prevent commencement of the undesired resource saving operation), as discussed below. After resetting the voice flag, the thread returns to reset the timer 430 and begins waiting again.

If, the timer expires, while the child thread is waiting for activity, the child thread checks to see if the voice flag has been set by the primary thread 470. If so, then the child thread simulates a keystroke being pressed or a cursor movement by writing to an appropriate input port to effectuate the desired simulation 480. Note that in the event of a simulated keystroke, care should be taken to ensure that the "application" process that will receive the simulated keystroke would not be adversely affected. For example, if the user device is a personal computer, and the application with the current focus of the keyboard is a word processor, a simulated keystroke would result in a character being displayed in a document. In such a case, a second "rubout" character will also need to be simulated to ensure the document being edited does not gain undesired characters. This sending of one or more keystrokes will cause the power saving functions that are responsible for determining when to power down a user device based on inactivity on the keyboard or mouse input devices to be duped into believing that user activities are taking place. In the prior art example shown in FIG. 1, the simulated input results in decision block 120 being evaluated true. In turn, the timer is reset, just prior to its expiration. If no voice activity is detected, the simulated event or events are not sent. In this example, the result of no activity is assumed to lead to an impending shut down of the user device, accordingly the child thread exits 490. However, in alternate embodiments, if the result of no activity is for the user device to go into a sleep mode, the child thread may be implemented to stay active, and reset itself when returning from the sleep mode. Further, with this embodiment, care should also be taken to make sure that enough time is left after the "preemption" timer expires to provide sufficient assurance of execution of steps 470-490 before the "resource saving" timer expires and the resource saving operations get performed.

Determining Timeout Periods

As can be seen with the previous examples of resource saving functions, a timeout determines when a resource saving operation will occur. One of the steps in practicing the present invention is to determine the timeout periods for the various resources where saving operations are provided. Determination of each of these periods can occur in various ways. These methods in general are affected by the support provided by the operating system of the target user device.

In one embodiment of the present invention, this timeout period can be determined empirically. For example, the goal may be to determine the timeout period for automatically disconnecting a modem from an inactive telephone line. In such a case, a control process may request that it be notified by the operating system when it shuts down a modem connection, as well as the receipt of a request to shut down the modem connection, including the identity of the requesting process. Further, the control process may request the operating system to send a message to the control process whenever a packet is received/sent using the modem, concurrent with forwarding the message to the recipient process. By determining the difference in time from the last message indicating activity and the time that the modem connection is torn down (as a result of a request from a resource saving process), the control process may determine the timeout period. By making several "readings" based on multiple samples of observations, the precision of the determined timeout period may be improved. A similar empirical method may be used for determine the timeout periods for other resources that are to be saved.

In other embodiments of the present invention, a singular control function may exist in a user device that is responsible for managing all the resource saving operations that will occur in the user device. In this embodiment, the control function has an API for communication with other processes in the user device, and the earlier described threads of the present invention may query this control function to determine the various timeout values. For example, each of the threads of the present invention may execute an appropriate procedure call of the API and provide the proper identifier for the timeout value of interest. In response, the control function provides each of the requesting threads with the corresponding timeout value of interest.

In various embodiments of the present invention, the timeout values are stored in known locations of a non-volatile memory, and are accessible via procedures calls to the operating system of the user device. More specifically, in various embodiments, the timeout values are stored in RAM and are available through memory accesses.

Initial Voice Pattern Determination

As described above, the method of the present invention is practiced by comparing voice samples collected from audio input signals sourced from an audio input device on the user device to a known voice reference sample. Presumptively the voice reference sample provided is a sample of the voice of the user of the user device. As a result, to begin the configuration of an embodiment of the present invention, it is contemplated that a user will provide a sample of the user's voice to the user device.

In one embodiment of the present invention, the user uses the same audio input device to record the voice reference sample. It is contemplated that the operating system of the user device includes common voice recording utilities. The recorded voice reference is stored in a fixed medium of the user device for later retrieval.

In another embodiment of the present invention, the user provides, in a preexisting digital format, a reference sample of the user's voice to use with the present invention. It is contemplated that the reference sample will be imported into the user device, via standard file utilities, and stored in a fixed medium of the user device for later retrieval.

User Device Embodiment

Figure 5:
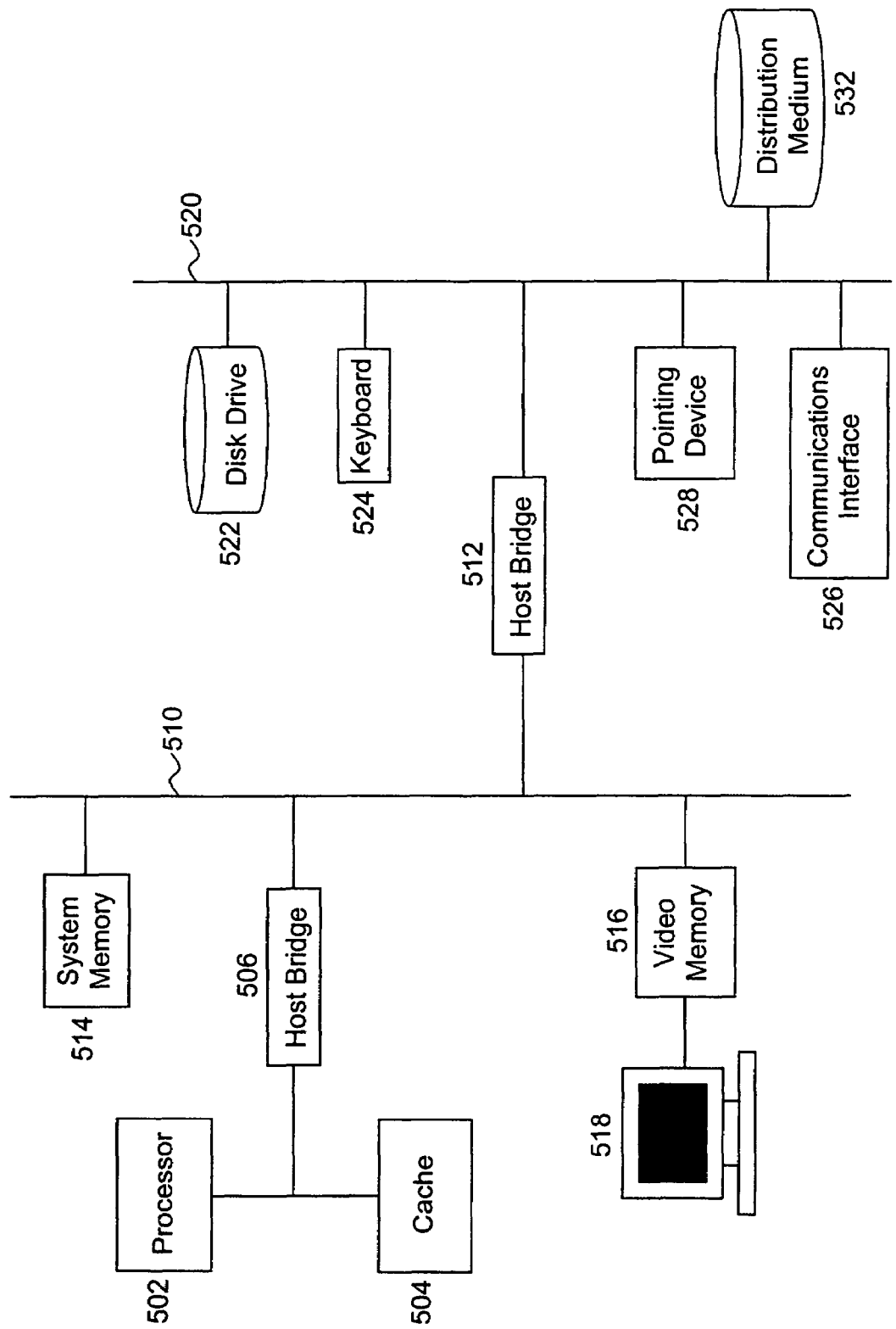
FIG. 5—Exemplary user device upon which the present invention may function.

FIG. 5 illustrates one embodiment of a user device suitable to be programmed with the user voice based resource saving preemption utility application of the present invention. As shown, for the illustrated embodiment, user device 500 includes processor 502, processor bus 506, high performance I/O bus 510 and standard I/O bus 520. Processor bus 506 and high performance I/O bus 510 are bridged by host bridge 508, whereas I/O buses 510 and 520 are bridged by I/O bus bridge 512. Coupled to processor bus 506 is cache 504. Coupled to high performance I/O bus 510 are system memory 514 and video memory 516, against which video display 518 is coupled. Coupled to standard I/O bus 520 are disk drive 522, keyboard 524 and pointing device 528, and communication interface 526.

These elements perform their conventional functions known in the art. In particular, disk drive 522 and system memory 514 are used to store permanent and working copies of the voice based resource saving preemption utility application. The permanent copy may be pre-loaded into disk drive 522 in the factory, loaded from distribution medium 532, or down loaded from a remote distribution source (not shown). Distribution medium 532 may be a tape, a CD, a DVD or other storage medium of the like. The constitutions of these elements are known. Any one of a number of implementations of these elements known in the art may be used to form computer system 500.

Certain embodiments may include additional components, may not require all of the above components, or may combine one or more components.

CONCLUSION

Thus, it can be seen from the above descriptions, a novel method for improving user activity based management of a user device is disclosed. The method by which this is accomplished is by determining whether the user remains proximately located next the user device. This proximity is determined by monitoring an audio input device for the presence of the users voice. If the user's proximate presence is determined, resource saving operations are preempted, e.g. through simulated activities. As those skilled in the art would appreciate that, the above descriptions are merely illustrative embodiments of the present invention. The present invention may be practiced with modifications, and the scope of the present invention is defined by the claims to follow.

What is claimed is:

1. A method comprising:
   determining by a first execution thread whether a user is proximately located with respect to a device;
   setting an indicator, by the first execution thread, if it is determined that the user is proximately located with respect to the device;
   determining by a second execution thread whether there is activity on the device; and
   simulating by the second execution thread, an activity on the device to prevent a first resource of the device from transitioning into a first resource saving state, if it is determined that there is no activity on the device within a first time period and the indicator remains set.

2. The method of claim 1 wherein said determining by the first execution thread whether the user is proximately located comprises monitoring by the first execution thread an audio input device for audio input.

3. The method of claim 2, wherein said determining by the first execution thread whether the user is proximately located further comprises determining whether the user's voice is present in said audio input.

4. The method of claim 3, wherein said determining by the first execution thread whether the user is proximately located further comprises comparing audio samples from said audio input to a voice reference sample of the user.

5. The method of claim 2, wherein said determining by the first execution thread whether the user is proximately located further comprises determining whether the audio input is above a predetermined threshold level.

6. The method of claim 1, wherein said determining by the first execution thread whether there is activity on the device comprises receiving notification of activity from an operating system of the device.

7. The method of claim 6, wherein said determining by the first execution thread whether there is activity on the device further comprises requesting said operating system to provide said notification of activity.

8. The method of claim 1, wherein said first time period has a period length shorter than a period of inactivity that will result in the first resource of the device in entering said first resource saving state.

9. The method of claim 1, wherein said simulating an activity comprises simulating one or more of a key press, a pointer device movement, and a network traffic event.

10. The method of claim 1, wherein the second execution thread is spawned by the first execution thread.

11. The method of claim 1, wherein said determining by the second execution thread whether there is activity on the device comprises determining by the second execution thread at least one of determining whether there is a key press, determining whether there is a pointer device movement, and determining whether there is a network traffic event.

12. The method of claim 1, further comprising:
    determining by a third execution thread, different from the first and second execution threads, whether there is activity on the device; and
    simulating by the third execution thread, an activity on the device to prevent a second resource of the device from transitioning into a second resource saving state, if it is determined that there is no activity on the device within a second time period and the indicator remains set, the first and second resources being different resources.

13. The method of claim 12, wherein the second and third execution threads are spawned by the first execution thread.

14. An apparatus, comprising:
    a storage medium; and
    programming instructions stored in the storage medium, configured to program the apparatus to implement a first execution thread equipped to determine whether a user is proximately located with respect to the apparatus, and set an indicator if it is determined that the user is proximately located with respect to the device; and a second execution thread equipped to determine whether there is activity on the apparatus, and simulate an activity to prevent a first resource of the apparatus from transitioning into a first resource saving state if it is determined that there is no activity on the apparatus within a first time period and the indicator remains set.

15. The apparatus of claim 14, wherein said first execution thread is different from said second execution thread.

16. The apparatus of claim 14, wherein said programming instructions are further configured to re-set the indicator if it is determined there is activity on the apparatus within the first time period.

17. A system, comprising:
    a processor; and
    a module configured to be operated by the processor to implement a first execution thread equipped to determine whether a user is proximately located with respect to the apparatus, and set an indicator if it is determined that the user is proximately located with respect to the device; and a second execution thread equipped to determine whether there is activity on the apparatus, and simulate an activity to prevent a first resource of the apparatus from transitioning into a first resource saving state if it is determined that there is no activity on the apparatus within a first time period and the indicator remains set.

18. The system of claim 17, wherein said first execution thread is different from said second execution thread.

19. The system of claim 17, wherein said module is further configured to re-set the indicator if it is determined there is activity on the apparatus within the first time period.

20. An apparatus, comprising:
    a storage medium having stored therein a plurality of programming instructions designed to implement a first execution thread equipped to determine whether a user is proximately located with respect to the apparatus, and set an indicator if it is determined that the user is proximately located with respect to the apparatus; and a second execution thread equipped to determine whether there is activity on the apparatus, and simulate an activity to prevent a first resource of the apparatus from transitioning into a first resource saving state if it is determined that there is no activity on the apparatus within a first time period and the indicator remains set; and
    a processor coupled to the storage medium to execute the programming instructions.

21. The apparatus of claim 20, wherein said programming instructions are designed to equip the first execution thread to perform said determining whether the user is proximately located by monitoring an audio input device of the apparatus for audio input.

22. The apparatus of claim 21, wherein said programming instructions are designed to equip the first execution thread to determine if the user's voice is present in said audio input, when performing said determining whether the user is proximately located.

23. The apparatus of claim 22, wherein said programming instructions are designed to equip the first execution thread to compare audio samples from said audio input to a voice reference sample of the user, when performing said determining by the first execution thread whether the user is proximately located.

24. The apparatus of claim 21, wherein said programming instructions are designed to equip the first execution thread to determine whether the audio input is above a predetermined threshold level.

25. The apparatus of claim 20, wherein said programming instructions are designed to equip the first execution thread to receive notification of activity from an operating system of the apparatus, when performing said determining whether there is activity on the apparatus.

26. The apparatus of claim 25, wherein said programming instructions are further designed to equip the second execution thread to request said operating system to provide said notification of activity, when performing said determining whether there is activity on the apparatus.

27. The apparatus of claim 20, wherein said first time period has a period length shorter than a period of inactivity that will result in the first resource of the apparatus in entering said first resource saving state.

28. The apparatus of claim 20, wherein said programming instructions are designed to equip the second execution thread to simulate one or more of a key press, a pointer device movement, and a network traffic event.

29. The apparatus of claim 20, wherein said programming instructions are designed to equip the first execution thread with an ability to spawn the second execution thread.

30. The apparatus of claim 20, wherein said programming instructions are designed to equip the second execution thread to perform said determining of whether there is activity on the device by determining at least one of whether there is a key press, whether there is a pointer device movement, and whether there is a network traffic event.

31. The apparatus of claim 20, wherein said programming instructions are further designed to implement a third execution thread equipped to determine whether there is activity on the device, and simulate by the third execution thread, an activity on the device to prevent a second resource of the device from transitioning into a second resource saving state, if it is determined that there is no activity on the device within a second time period and the indicator remains set.

32. The apparatus of claim 31, wherein said programming instructions are further designed to equip the first execution thread with an ability to spawn the second and third execution threads.

33. A program product comprising a plurality of programming instructions adapted to program an apparatus to enable the method as set forth in claim 1 to be practiced on the apparatus.

34. A storage medium comprising a plurality of programming instructions adapted to program an apparatus to enable the method as set forth in claim 1 to be practiced on the apparatus.

* * * * *